United States Patent [19]
Turner

[11] Patent Number: 5,452,840
[45] Date of Patent: * Sep. 26, 1995

[54] WATER-SOLUBLE SOLDERING FLUX

[75] Inventor: Raymond L. Turner, La Habra, Calif.

[73] Assignee: Hughes Aircraft Company, Los Angeles, Calif.

[*] Notice: The portion of the term of this patent subsequent to Feb. 4, 2009 has been disclaimed.

[21] Appl. No.: 144,103

[22] Filed: Oct. 27, 1993

Related U.S. Application Data

[63] Continuation of Ser. No. 20,877, Feb. 19, 1993, abandoned, which is a continuation of Ser. No. 829,130, Jan. 31, 1992, abandoned, which is a continuation-in-part of Ser. No. 705,858, May 28, 1991, abandoned, which is a division of Ser. No. 607,200, Oct. 31, 1990, abandoned, which is a continuation-in-part of Ser. No. 523,765, May 15, 1990, Pat. No. 5,085,365.

[51] Int. Cl.⁶ .................................................. B23K 35/363
[52] U.S. Cl. .................... 228/180.1; 228/207; 228/223; 148/23
[58] Field of Search .................. 228/180.1, 207, 228/223, 220; 148/23, 24, 25

[56] References Cited

U.S. PATENT DOCUMENTS

| | | | |
|---|---|---|---|
| 1,402,644 | 1/1922 | Passalacqua | 148/23 |
| 1,535,492 | 4/1925 | Passalacqua | 228/206 |
| 1,805,458 | 5/1931 | Rogers | 106/244 |
| 2,155,307 | 4/1939 | Hagemann et al. | 148/25 |
| 2,470,957 | 5/1949 | Strader | 148/23 |
| 3,020,635 | 2/1962 | Redgrift | 228/223 X |
| 3,091,029 | 5/1963 | Davis | 228/224 |
| 3,162,547 | 12/1964 | Kendall | 134/3 |
| 3,220,892 | 11/1965 | Durham, Jr. | |
| 3,305,406 | 2/1967 | Chmelick et al. | 148/23 |
| 3,459,606 | 8/1969 | Becker | 148/23 |
| 3,684,533 | 8/1972 | Conwicke | 148/24 |
| 3,723,191 | 3/1977 | Bos et al. | 148/23 |
| 3,734,791 | 5/1973 | Poliak | 148/23 |
| 3,925,112 | 12/1975 | Petersen, Sr. et al. | 148/25 |
| 3,966,632 | 6/1976 | Colliopoulos et al. | 106/244 |
| 4,073,412 | 2/1978 | Doumani | 106/244 |
| 4,113,525 | 9/1978 | Stayner | 148/23 |
| 4,183,767 | 1/1980 | Kessler | 106/236 |
| 4,290,824 | 9/1981 | Cole | 148/23 |
| 4,342,606 | 8/1982 | Notton | 148/23 |
| 4,342,607 | 8/1982 | Zado | 148/23 |
| 4,460,427 | 7/1984 | Haney et al. | 427/98 |
| 4,478,650 | 10/1984 | Zado | 148/23 |
| 4,568,395 | 2/1986 | Nabhani | 148/23 |
| 4,708,281 | 11/1987 | Nelson et al. | 228/223 X |
| 4,708,751 | 11/1987 | Froebel et al. | 148/23 |
| 4,738,732 | 4/1988 | Anderson et al. | 148/23 |
| 4,759,490 | 7/1988 | Ochiai | 148/24 |
| 4,762,573 | 8/1988 | Biverstedt | 148/23 |
| 4,821,948 | 4/1989 | Fisher et al. | 228/223 |
| 4,872,928 | 10/1989 | Jacobs | 148/24 |
| 5,085,365 | 2/1992 | Turner | 228/223 |
| 5,190,208 | 3/1993 | Turner | 228/207 |

FOREIGN PATENT DOCUMENTS

| | | | |
|---|---|---|---|
| 090960 | 3/1983 | European Pat. Off. | B23K/35/36 |
| 104106 | 3/1922 | France . | |
| 2052713 | 10/1970 | Germany | B23K/1/02 |
| 460965 | 4/1975 | U.S.S.R. | 148/23 |
| 2080341 | 7/1980 | United Kingdom | B23K/35/362 |

OTHER PUBLICATIONS

Patent Abstracts of Japan, vol. 11, No. 175 (M–596) [2622], 5th Jun. 1987; & unexamined Japanese Patent Publication No. 62–6796 (including translation).

Soviet Inventions Illustrated, week 8747, 2nd Dec. 1987, abstract No. 333423, Derwent Publications Ltd, London. GB; & SU–A–1 303 341 (A. I. Bulatov) Apr. 15, 1987 (including translation).

Primary Examiner—Kenneth J. Ramsey
Attorney, Agent, or Firm—W. K. Denson-Low

[57] ABSTRACT

A non-toxic, non-corrosive liquid soldering flux consists essentially of a solution of citric acid in water. This unique flux produces solder joints of high metallic luster and excellent quality. Disposal presents no health hazards, and clean-up of flux residues is accomplished using only water.

10 Claims, No Drawings

WATER-SOLUBLE SOLDERING FLUX

CROSS-REFERENCE TO RELATED APPLICATIONS

The present application is a continuation of application Ser. No. 07/020,877, filed Feb. 19, 1993, (abandoned) which is a continuation of application Ser. No. 829,130, filed Jan. 31, 1992, (abandoned) which is a continuation-in-part application of Ser. No. 07/705,858, filed May 28, 1991, (abandoned) which is a divisional application of Ser. No. 07/607,200, filed Oct. 31, 1990, (abandoned) which is a continuation-in-part application of Ser. No. 07/523,765, filed May 15, 1990 (U.S. Pat. No. 5,085,365).

TECHNICAL FIELD

The present invention relates to a novel soldering flux used in liquid wave soldering.

BACKGROUND ART

Most fluxes and defluxing chemicals used by industry to manufacture electronic circuits, such as military hardware, are either contributing to ozone depletion of the atmosphere or are considered by local environmental agencies, such as the Air Quality Management District in the Los Angeles basin, as environmental pollutants or health hazards. For example, it has been reported that if CFCs (chlorofluorohydrocarbons), which are used in vapor degreasing to clean soldered parts where a rosin flux is employed, are released to the atmosphere, they will remain there as an ozone depletant for nearly 100 years. Other chemicals such as rosin fluxes, alcohols, and the like pose health risks and disposal problems for industry.

Water-soluble fluxes could be the simple solution for this major problem. However, most water-soluble fluxes are formulated with harsh activators, such as hydrochloric acid and complex glycols, which create major cleaning and residue problems for the printed circuit board and the electrical circuitry thereon and which tend to severely corrode the metal being soldered or contaminate the dielectric, causing a tendency for electromigration. Other water-soluble fluxes are formulated with iso-propanol and/or plasticizers, which create disposal and health problems.

Various attempts have been made to improve the quality of solder fluxes. In many instances, carboxylic acids of various types have been added.

For example, U.S. Pat. No. 3,020,635, issued to H. F. Redgrift, discloses soldering methods. Specifically, Redgrift discloses the use of a solution of lactic acid as a flux, which may be a 15 to 25% solution of lactic acid in water. Alternatively, a 40% solution of ortho-phosphoric acid in water may be used. However, the present applicant has found that a flux containing 40 wt. % lactic acid exhibited incomplete close-up of 60/40 tin/lead solder rings (⅜ inch diameter) placed on copper panels and also showed evidence of copper corrosion. Further, hand-soldered connections to 14-lead dual inline packages (DIPs) onto printed wiring boards (PWBs) exhibited solder discontinuities (voids), rough porous solder quality, and excess stress lines within the solder fillets. Finally, during wave soldering processes, used to solder DIPs onto PWBs, the lactic acid flux smoked profusely when the board entered the solder zone. The lactic acid fluxed portion of the PWB exhibited solder shorts, solder horns, solder webbing, and solder bridges too numerous to count.

U.S. Pat. No. 4,809,901 issued to T. G. Gen et al discloses soldering methods and devices. The disclosure includes use of a flux composition which is capable of undergoing a visible color change at a critical temperature. The flux is a commercially available rosin-based flux comprising 37% of a mixture of rosin isomers in 63% iso-propyl alcohol (Col. 6, lines 12–16). To this flux may be added "dispersing aids such as water, alcohol or a subfactant [sic: surfactant] or emulsifier, buffers, such as an acid or salt to maintain the desired pH, for example, oxalic acid, lactic acid, maleic acid, tartaric acid, fumaric acid or citric acid, stabilizers and the like".

However, rosin-based fluxes require CFCs in a vapor-degreasing process to clean soldered parts. As noted above, the use of CFCs has been found to contribute to the depletion of the ozone layer, and hence efforts are underway to drastically reduce or even eliminate the use of CFCs in processing. Further, rosin-based fluxes pose health risks and disposal problems for industry.

Additional references disclosing the use of carboxylic acids as components of fluxes include U.S. Pat. No. 4,568,395, issued to A. R. Nabhani, U.S. Pat. No. 4,460,427, issued to D. M. Haney et al, and U.S. Pat. No. 3,091,029, issued to C. L. Davis et al. These references typically contain additional components that are harmful to the environment.

Japanese Unexamined Patent Application No. 62-6796 discloses the use of carboxylic acid-based fluxes. However, the fluxes require at least two kinds of carboxylic acids, such as oxysuccinic acid, tartaric acid, citric acid, glycolic acid, lactic acid, hydroacrylic acid, oxybutylic acid, glyceric acid, and tartaronic acid, in a solvent such as glycol ethers (e.g., methyl cellusolve, ethyl cellusolve, and butyl cellusolve), alcohols (e.g., methyl alcohol, ethyl alcohol, and iso-propyl alcohol), and water, alone or in combination. Again, many of these components are harmful to the environment.

What is desired is a simple, non-toxic, non-corrosive liquid soldering flux that produces solder joints of high metallic luster and excellent quality, regardless of the method of soldering (hand, wave, drag, etc.).

DISCLOSURE OF INVENTION

In accordance with the invention, a soldering method is provided, employing a novel soldering flux. The method comprises applying to a metal surface the solder flux, heating the metal surface to a desired soldering temperature, and applying solder to the surface. The solder flux used in the method of the invention consists essentially of a solution of citric acid in a carrier consisting essentially of water.

The flux used in the method of the invention eliminates harmful environmental emissions normally associated with rosin-based fluxes, flux thinner (such as iso-propanol), and associated defluxing solvents (such as CFCs). The flux of the invention is environmentally safe, nontoxic, and easy to use. Soldering time is cut in half, and defluxing (cleaning) time is reduced from ten to fifteen minutes (required for rosin-based fluxes) to about five minutes. Soldered assemblies can be cleaned in deionized water, thus eliminating the high capital costs associated with vapor degreasing equipment. The resulting soldered joint exhibits high metallic luster and excellent electrical quality.

While the prior art has listed citric acid as a possible component in solder fluxes or has included citric acid in a list of organic carboxylic acid activators, the art has not recognized or taught that aqueous solutions of citric acid alone are superior to fluxes which include citric acid along with other active components or are superior to other fluxes containing aqueous solutions of various carboxylic acids. This superiority is manifested in the properties described above.

BEST MODES FOR CARRYING OUT THE INVENTION

The flux employed in the method of the invention consists essentially of a solution of citric acid in a carrier consisting essentially of water.

Without subscribing to any particular theory, it appears that the citric acid chelates the oxide, but not the basis metal. As a result, there is little or no corrosion of the basis metal by the flux employed in the practice of the invention.

The concentration range of citric acid in water may range from about 0.5 weight percent to saturation. A saturated solution of citric acid in water is about 70.58 wt. % at ambient.

A concentration of at least about 5 wt. % provides noticeably improved soldering results, and accordingly, this is the preferred minimum concentration of citric acid employed. A concentration of at least about 20 wt. % ensures consistently improved soldering results, even for less-than-ideal soldering surfaces, and consistent with this, the minimum concentration is most preferably at least about 20 wt. %.

For soldering purposes, concentrations above about 50 wt. % provide no additional improvement, and accordingly, this is the preferred maximum concentration. Most preferably, the maximum concentration for use in soldering is about 40 wt. %.

The flux of the invention may also be employed in tinning operations. In this case, surfaces to be tinned, such as the surfaces of component leads, are often difficult to tin, due to the presence of oxides and/or surface contaminants. Accordingly, the preferred concentration of citric acid flux in this case ranges from about 40 wt. % to saturation. In actual use, the maximum concentration is just below saturation; that is, slightly less than the concentration at which precipitation of the citric acid from solution would occur.

The quality of water used and the grade of citric acid employed are not material in the practice of the invention, although for extremely sensitive electrical circuits, it may be desirable to employ distilled or deionized water and a fairly high grade of citric acid. The source of the citric acid is also immaterial, and may comprise, for example, commercially-produced powder or crystal or even fruit juice or fruit juice concentrate, such as juice from oranges, lemons, limes, grapefruits, pineapples, tomatoes, and the like. Finally, the flux may contain other components, such as impurities, whether accidental or deliberate, so long as such additives have no adverse effect on the soldering results.

Thickening agents may be added to the flux in order to include the flux inside cored solder. Examples of suitable thickening agents include corn starch, tinning oil, gelatin, emulsifiers, and polyvinyl compounds. Such thickening agents are added to provide a flux having the requisite viscosity, as is well-known in the art. Alternatively, the solder may be cored with pure citric acid, as disclosed and claimed in copending application Ser. No. 07/708,961, filed May 31, 1991 now issued as U.S. Pat. No. 5,192,360, and assigned to the same assignee as the present application.

The flux may also be combined with particulate solder and appropriate agents to form a solder paste, as disclosed in copending application Ser. No. 07/608,041, filed Oct. 31, 1990 now issued as U.S. Pat. No. 5,141,568, and assigned to the same assignee as the present application.

Additives may be added to the flux for specific purposes. For example, an odorant, such as wintergreen oil, spearmint oil, or peppermint oil, may be added to the flux to provide a pleasant odor for the user. Such an odorant is typically added in the amount of about 1 to 30 ppm.

A colorant may be added for visual purposes; this enables the operator to see the flux, which is otherwise colorless. About 1 to 30 ppm of at least one clothes dye may be added in this regard.

Surfactants may be added to enhance the cleaning process. Non-ionic wetting agents, such as ethoxylated alcohol, available under the tradename Triton X-100 from Rohm & Haas (Los Angeles, Calif.), may be added up to about 10% of the flux.

The flux is most advantageously employed in the soldering of electrical connections of electronic components to printed circuit boards. Such printed circuit boards typically comprise copper-plated lines surrounding via openings, which are copper-plated followed by a tin-lead coating over the copper, in the PCB through which the leads of the components extend. The solder employed during component soldering is typically a tin-lead solder, and the flux of the invention has been successfully used with 60-40, 63-37, and 96-4 tin-lead solders. In most applications, 63-37 tin-lead solder is employed.

The flux of the invention may be applied by a variety of techniques. However, to minimize splattering, due to the presence of water, during wave soldering, a preferred method of applying the flux is by mist-spraying, using a fogging system. The mist-spraying dampens the board in such a manner as to avoid an excessive number of individual droplets of flux, thereby avoiding splattering during wave soldering. More particulars as to the mist-spraying technique and the apparatus used to implement it are given in a companion application, assigned to the same assignee as the present application and bearing U.S. Ser. No. 07/608,042 and filing date of Oct. 31, 1990 now issued as U.S. Pat. No. 5,145,531.

More preferably, for wave-soldering processes, flux is applied to the metal surface by forming a foam, using the flux composition disclosed herein together with one or more foaming agents. Examples of foaming agents include sulfates, sulfonates, sarcosinates, nonyl phenol ethoxylates having about 6 to 30 moles ethoxylation, octyl phenol ethoxylates having about 4.5 to 30 moles ethoxylation, amides, amine oxides, silicone glycol copolymers, phosphate esters, quaternary ammonium compounds, imidazolines, and betaines. Specific examples of preferred foaming agents include sodium 1-octane sulfonate, N-octyl-2-pyrrolidone, fluoroalkyl sulfonate, sodium alkyl sulfonate, polyoxyalkylene glycol, octyl phenoxy polyethoxy ethanol, and ethoxylated alcohol. Most preferably, the foaming agent is one selected from the group consisting of (a) about 0.0315 to 0.0385 wt. % sodium alkyl sulfonate; (b) about 0.0018 to 0.003 wt. % polyoxyalkylene glycol; (c) about 0.0030 to 0.0043 wt. % octyl phenoxy polyethoxy ethanol; (d) about 0.0024 to 0.0037 wt. % ethoxylated alcohol; and (e) a mixture of foaming agents comprising about 0.0022 to 0.0032 wt. % sodium 1-octane sulfonate, about 0.0020 to 0.0030 wt. % N-octyl-2-pyrrolidone, and about 0.0002 to 0.0004 wt. % fluoroalkyl sulfonate. Such foaming fluxes are disclosed and claimed in copending applications Ser. Nos. 07/780,169 and 07/780,170, filed Oct. 21, 1991 now issued as U.S. Pat. Nos. 5,198,038 and 5,190,208, respectively, and assigned to the same assignee as the present application.

The flux of the invention provides the following advantages:

1. It eliminates harmful environmental emissions normally associated with rosin-based fluxes, flux thinner (such as iso-propyl alcohol), and associated defluxing agents (such as 1,1,1-trichloroethane). Indeed, cleaning of the flux is simply done in warm or hot water. Thus, the new flux is environmentally safe.

2. It provides soldering personnel with a nontoxic, extremely safe, and highly effective flux to use.

3. Its use cuts the actual soldering time by approximately 50%. This enables automated soldering, using liquid wave soldering, to proceed at a rate twice as fast as with rosin-based solders, thereby subjecting electronic components to the heat of the solder for a far shorter period of time.

4. Defluxing (cleaning) time is cut from ten to fifteen minutes per unit (in CFC degreaser) to about five minutes (in heated water).

5. Wave soldered assemblies can be cleaned in deionized water, thus eliminating the high capital cost of vapor degreasing equipment. The recurring costs of solvents and the costs associated with redistillation are also eliminated.

6. Use of the flux of the invention eliminates the need for costly control of solvent usage and equipment permits required by local environmental agencies (such as AQMD in the Los Angeles basin).

7. Use of the flux significantly reduces waste disposal and waste management costs; the flux is biodegradable and water soluble.

8. Use of the flux of the invention provides solder joints that evidence high metallic luster and excellent electrical quality.

INDUSTRIAL APPLICABILITY

The solder flux of the invention is expected to find use in commercial liquid manual and automatic soldering operations, particularly in soldering electrical components in circuit boards.

EXAMPLES

Example 1. Flux Activation Test:

A flux activation test, comparing prior art fluxes (RMA, Alpha 857, Kester 2224) to the flux of the invention (citric acid solution), was performed by applying various fluxes to copper panels (2 inch×2 inch), then drying the flux at 230° F for 1 hour. The fluxed specimens were then cleaned and evaluated. Table I lists the composition of the flux and its appearance. RMA refers to Kester 185 rosin mildly active; Alpha 857 and Kester 2224 are water-soluble fluxes. The concentration of citric acid used was 900 g of citric acid powder per liter of water. The flux of the invention is a clear liquid.

TABLE I

| Flux Composition | Appearance |
| --- | --- |
| RMA, Kester 185 | no chemical reaction to copper |
| Alpha 857 | severe chemical reaction to copper (multi-colored etch) |
| Kester 2224 | severe chemical reaction to |

TABLE I-continued

| Flux Composition | Appearance |
| --- | --- |
| | copper (multi-colored etch) |
| Citric Acid | no chemical reaction to copper |

The flux of the invention was on a comparable level with RMA, whereas the two commercial brands of water-soluble fluxes appeared as aggressors to copper. It was clear from the test that the flux of the invention is a unique flux and should not be placed in the category of commercial water-soluble fluxes.

Without subscribing to any particular theory, it appears that the flux of the invention acts as a chelating agent, attacking oxides without attacking the basis metal.

Example 2. Solder Spread Test:

A. Comparison between Citric Acid Flux and Rosin "RMA" Flux.

A comparison spread test was conducted to determine if the solder spread using the flux of the invention (40 wt. % citric acid solution) was comparable to that of rosin "RMA" flux. Solder wire (0.062 inch diameter) was formed into solder rings of ⅜ inch diameter and placed in the center of copper panels measuring 2 inch×2 inch. Three drops of flux were placed in the center of each ring. All panels were then vapor phase re-flowed at the same time. The area of solder spread using the flux of the invention was repeatedly found to be over twice that of the RMA flux. Moreover, the flux of the invention evidenced a higher luster and better wetting of the substrate, compared to the RMA flux.

From the foregoing, it is clear that the flux of the invention is far superior to the RMA flux. It should also be noted that the basis metal of the copper was not attacked by the RMA flux or by the flux of the invention.

B. Comparison between Citric Acid and Lactic Acid.

A lactic acid flux was formulated using 40 wt. % lactic acid in deionized water. Citric acid was used as a comparative standard, comprising 40 wt. % solution in deionized water.

Solid solder rings (⅜ inch inside diameter) having an alloy of 60% tin and 40% lead were placed on two 2 inch ×2.75 inch copper panels. Three drops of the lactic acid flux were placed in the center of each ring. In addition, the same amount of citric acid flux was applied to the other solder rings. The fluxed copper panels were then heated to 500° C. for 25 seconds.

The lactic acid flux exhibited incomplete close-up of the solder ring (improper solder spread) and copper corrosion as evidenced by the formation of a green residue on the outer periphery of the solder rings.

In contrast, the citric acid appeared to remove oxides from the copper as evidenced by the appearance of a light area surrounding the filled-in copper rings. The citric acid flux did not exhibit copper corrosion.

Thus, lactic acid reacts negatively to copper as evidenced by copper corrosion and the fluxing action is inferior to citric acid flux as evidenced by incomplete closure of the solder rings.

Example 3. Hand Soldering Test:

Three 14-lead dual inline packages (DIPs) were mounted onto a conventional printed wiring board (PWB) and hand-soldered using solid solder wire (60/40 tin/lead). Two DIPs were liberally covered with lactic acid flux as prepared in Example 2B and the other DIP was covered equally with citric acid flux as prepared in Example 2B. A temperature-controlled Weller soldering iron was used. The soldering temperature was set at a conventional temperature of 630° F.

During the hand soldering operation (performed under 3X magnification), there appeared to be a rapid deterioration of the fluxing action of lactic acid fluxed soldered connections, while the citric acid flux responded rapidly, resulting in a free-flowing of molten solder inside the plated-through hole connections on the PWB.

The premature deterioration of the lactic acid flux resulted in inferior soldered connections on both DIPs (28) soldered connections. The connections exhibited solder discontinuities (voids), rough porous solder quality, and excessive stress lines within the solder fillets.

In contrast, the citric acid fluxed connections exhibited bright, shiny, and smooth connections.

The rapid deterioration of lactic acid flux results in inferior solder joint quality which would be rejected by all military soldering standards, whereas citric acid flux produces superior solder joint quality.

Example 4. Wave Soldering Test:

Six DIPs were inserted into plated-through holes on one PWB in preparation for wave soldering. DIPs 1, 2, and 3 were spray-fluxed using lactic acid flux as prepared in Example 2B and DIPs 4, 5, and 6 were spray-fluxed using citric acid flux as prepared in Example 2B. The fluxed PWB was placed in a wave solder fixture and wave soldered, using conventional production wave soldering parameters: board preheat temperature was set to produce a top-side board temperature of 170° to 190° F., the solder temperature measured 505° F., and the transporting speed for the PWB assembly was set at 7.0 feet per minute. The wave soldering system was a Hollis, GBS III.

During the wave soldering cycle, it was observed that the lactic acid flux smoked profusely when the board entered the solder zone and it continued to smoke beyond the solder zone.

The PWB was examined visually under 20X magnification. It was quickly noted that the reverse side (solder contact side) of the lactic acid fluxed portion of the PWB exhibited solder shorts, solder horns, solder webbing, and solder bridges too numerous to count. In addition, the component side showed insufficient solder penetration within the plated-through holes. This condition was also typical throughout DIPs 1, 2, and 3.

In contrast, the citric acid fluxed portion of the PWB (DIPs 4, 5, and 6) manifested superior solder quality. The 42 DIP lead solder connections were bright, shiny, and smooth. Each soldered connection exhibited good top side solder filling of the plated-through holes, good solder wetting and well-contoured solder fillets. The reverse (solder) side of the board was completely free of solder defects (bridging, shorts, webbing, etc.)

Thus, lactic acid flux is an extremely poor soldering flux and would fail to comply with good workmanship standards, whereas citric acid flux has demonstrated its superiority in soldering performance and solder joint quality.

Example 5. Surface Resistance. Measurements:

The surface insulation resistance test is to assess the degree of degradation of electrical insulation existing between parallel circuit board conductors when subjected to high humidity and high heat for 168 hours. The epoxy PWB specimens and associated test environment were performed in accordance with military flux specification MIL-F-14256E. The PWB test specimens were typically etched circuitry combs whose teeth were copper traces with an over-plate of tin-lead. The comb pattern consisted of two conductive combs whose teeth were centrally interwoven, or interdigitated, one to the other without making contact, and spaced apart by 0.012 inch. The comb test specimens were of a design and construction specified in an interconnection packaging circuitry specification designated IPC-B-25 (style B). This specification is set by the Institute for Interconnecting and Packaging Electronic Circuits and accepted by the military).

The epoxy board comb specimens were fluxed with the flux of this invention (40 wt. % citric acid in deionized water), wave-soldered using typical wave solder parameters, then aqueous-cleaned to remove flux residue. Test cables were soldered to the cleaned IPC-B-25 test specimens and placed inside an environmental test chamber set at 85° C., 85% relative humidity for a duration of 168 hours.

Each specimen was polarized at 50 VDC, one comb was biased negatively and the other biased positively. The voltage was applied during the entire 168 hour exposure, except during the period of measuring the surface insulation resistance of comb segments.

Surface insulation resistance as specified by MIL-F 14256E shall not be less than 100 MΩ at 96 and 168 hours, during environmental exposure. Specimens shall have 500 MΩ surface insulation resistance within two hours after completion of testing. Although three IPC-B-25 test specimens are required for this test, twelve such specimens were used, and all twelve successfully met or exceeded the required surface insulation resistance values of specification MIL-F-14256E.

Thus, there has been disclosed a non-toxic, non-corrosive liquid soldering flux, suitable for use in soldering electrical components. It will be clear to those skilled in the art that various changes and modifications of an obvious nature may be made, and all such changes and modifications are considered to fall within the scope of the invention, as defined by the appended claims.

What is claimed is:

1. A method for soldering a metal comprising applying to a surface thereof a soldering flux, heating said metal to a desired soldering temperature, and applying to said surface, characterized in the active component of said soldering flux consists essentially of about 0.5 to saturation of citric acid in water;

wherein said flux further includes at least one foaming agent, wherein said flux is applied to said surface as a foam, and wherein said solder is applied to said surface by wave soldering;

wherein said at least one foaming agent is selected from the group consisting of (a) about 0.0315 to 0.0385 wt. % sodium alkyl sulfonate; (b) about 0.0018 to 0.003 wt. % polyoxyalkylene glycol; (c) about 0.0030 to 0.0043 wt. % octyl phenoxy polyethoxy ethanol; and (d) about 0.0024 to 0.0037 wt. % ethoxylated alcohol.

2. A method for soldering a metal comprising applying to a surface thereof a soldering flux, heating said metal to a desired soldering temperature, and applying solder to said surface, said soldering flux having an active component consisting essentially of about 0.5 to saturation of citric acid in water and wherein said flux further includes at least one foaming agent selected from the group consisting of (a) about 0.0315 to 0.0385 wt. % sodium alkyl sulfonate; (b) about 0.0018 to 0.003 wt. % polyoxyalkylene glycol; (c) about 0.0030 to 0.0043 wt. % octyl phenoxypolyethoxy ethanol; and (d) about 0.0024 to 0.0037 wt. % ethoxylated alcohol.

3. The method of claim 2 which further comprises the steps of:

generating a foam from the flux;

passing the surface to be soldered through the foam; and thereafter, passing the surface through a wave of solder.

4. The method of claim 2 wherein said flux further includes an odorant.

5. The method of claim 4 wherein said odorant is selected from the group consisting of wintergreen oil, spearmint oil, an d peppermint oil, present in an amount of about 1–30 ppm.

6. The method of claim 2 wherein the flux further includes a colorant.

7. The method of claim 6 wherein said colorant is at least one clothes dye, present in an amount of about 1–30 ppm.

8. The method of claim 2 wherein said citric acid ranges from about 5 to 50 wt. %.

9. The method of claim 2 wherein said concentration ranges from about 20 to 40 wt. %.

10. The method of claim 9 wherein said surface is copper or tinned copper and said solder is a tin-lead solder.

\* \* \* \* \*